Aug. 1, 1950  I. I. SIKORSKY  2,517,509
HELICOPTER ROTOR CONTROL

Filed May 9, 1945  14 Sheets-Sheet 1

IGOR I. SIKORSKY
INVENTOR

BY *Gifford J. Holmes*
AGENT

IGOR I. SIKORSKY
INVENTOR

BY *Gifford J. Holmes*
AGENT

Aug. 1, 1950     I. I. SIKORSKY     2,517,509
HELICOPTER ROTOR CONTROL
Filed May 9, 1945     14 Sheets-Sheet 3

IGOR I. SIKORSKY
INVENTOR
BY *Gifford L. Holmes*
AGENT

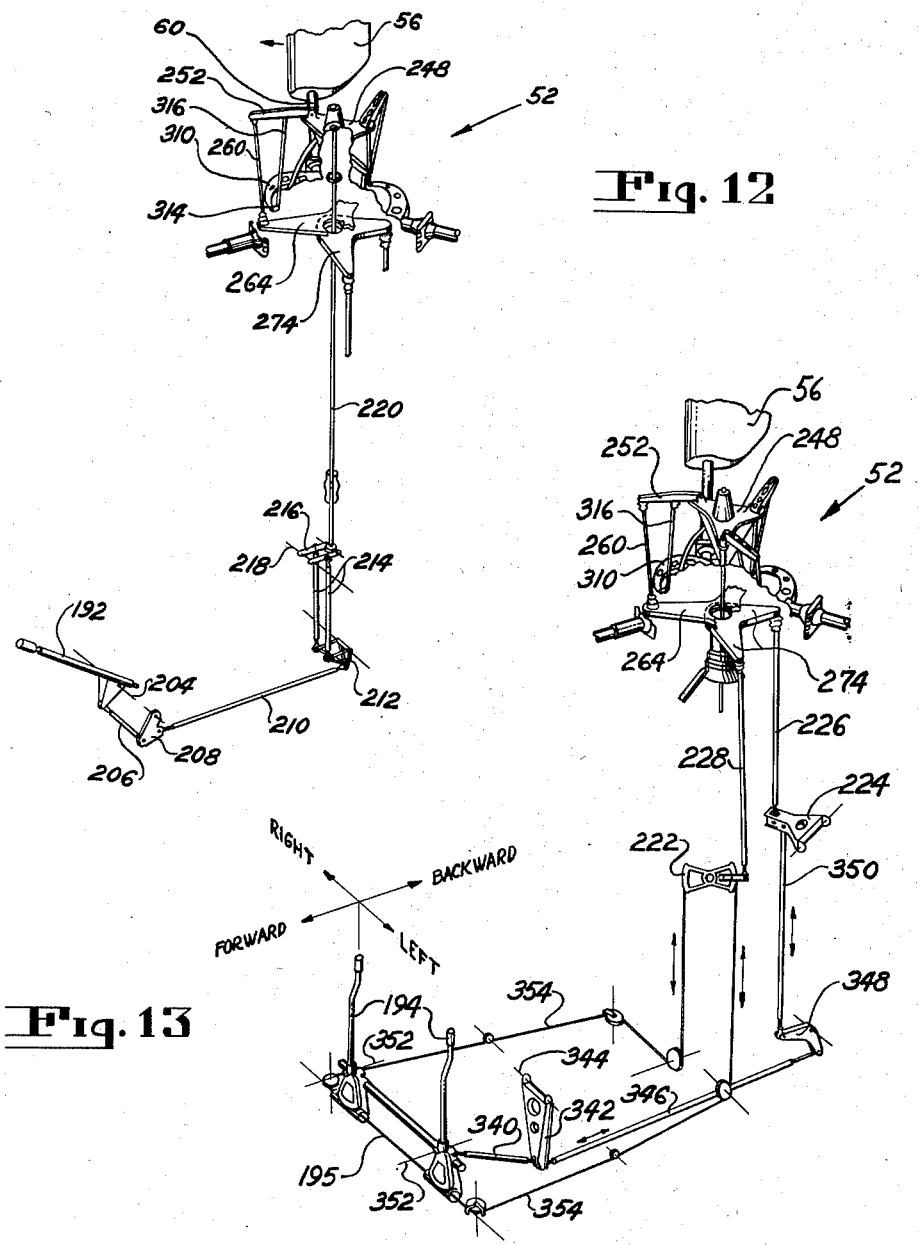

IGOR I. SIKORSKY
INVENTOR

Aug. 1, 1950      I. I. SIKORSKY      2,517,509
HELICOPTER ROTOR CONTROL
Filed May 9, 1945      14 Sheets-Sheet 10
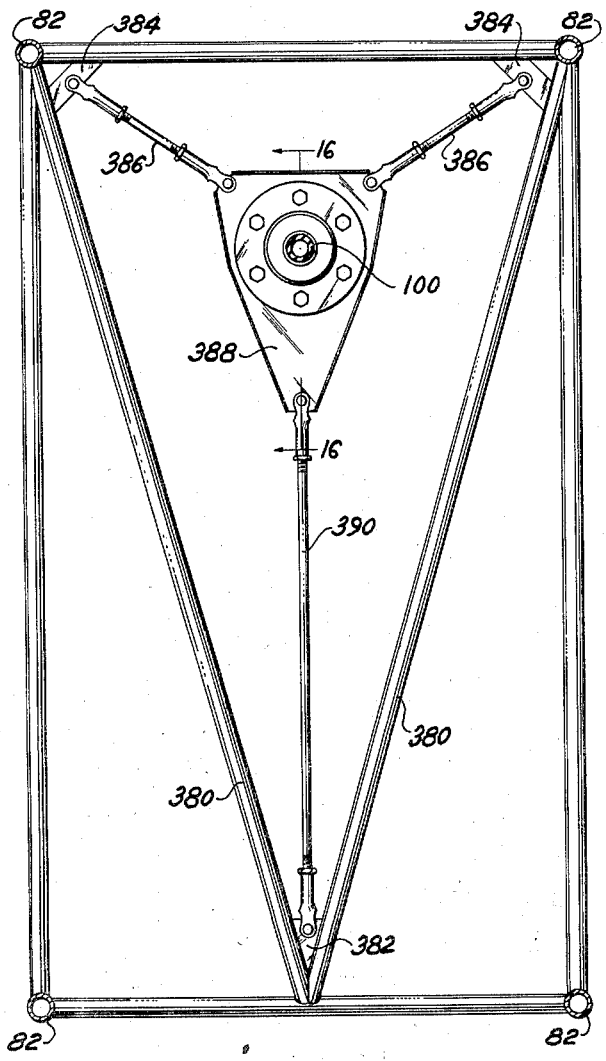
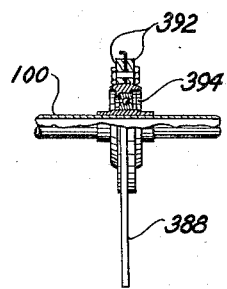
Fig. 16
Fig. 15
IGOR I. SIKORSKY
INVENTOR
BY Gifford S. Holmes
AGENT

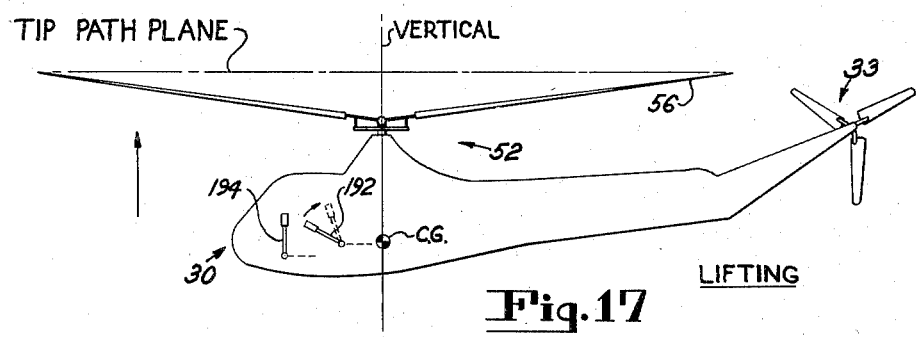
Fig. 17 — LIFTING
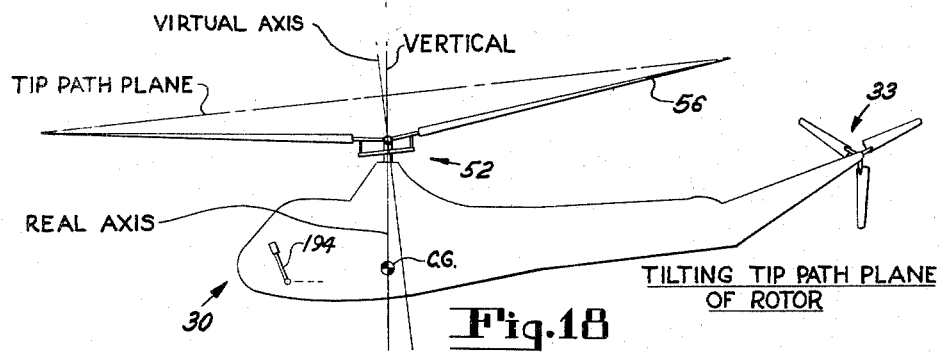
Fig. 18 — TILTING TIP PATH PLANE OF ROTOR
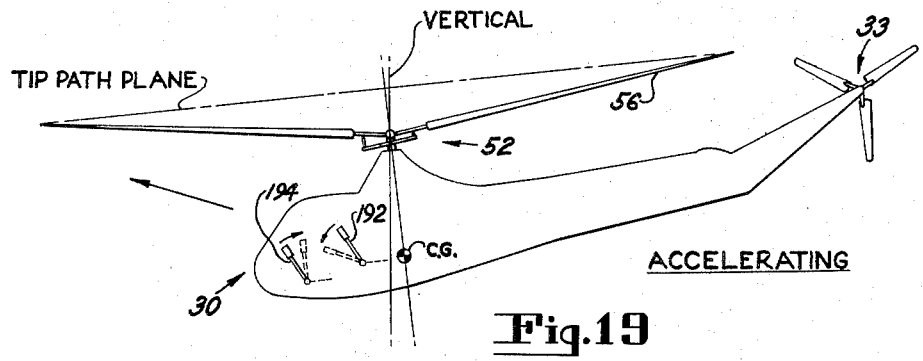
Fig. 19 — ACCELERATING Aug. 1, 1950  I. I. SIKORSKY  2,517,509
HELICOPTER ROTOR CONTROL
Filed May 9, 1945  14 Sheets-Sheet 12

STEADY LEVEL FLIGHT

DECELERATING

IGOR I. SIKORSKY
INVENTOR

BY Gifford L. Holmes
AGENT

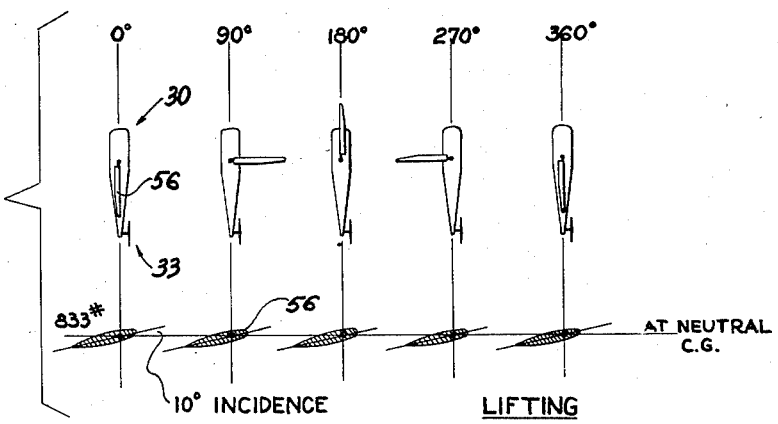
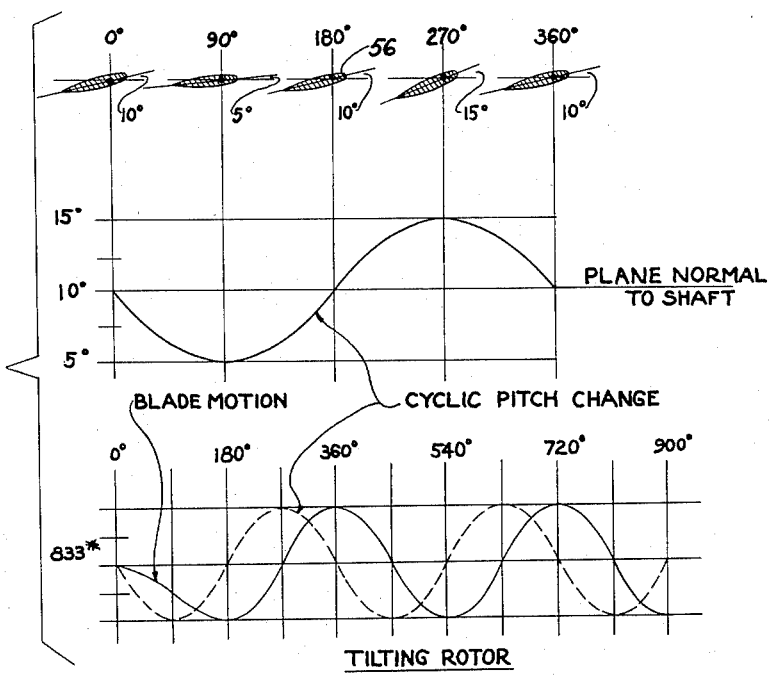

Patented Aug. 1, 1950

2,517,509

UNITED STATES PATENT OFFICE 2,517,509

HELICOPTER ROTOR CONTROL

Igor I. Sikorsky, Bridgeport, Conn., assignor to United Aircraft Corporation, East Hartford, Conn., a corporation of Delaware Application May 9, 1945, Serial No. 592,862

5 Claims. (Cl. 244—17.11)

The present invention relates to improvements in aircraft, and more particularly to an improved aircraft of the direct lift type such as those shown in my prior patents, Nos. 2,318,259 and 2,318,260 and ordinarily referred to as helicopters.

In this improved structure, control mechanism is provided for improving the operation of helicopters and for rendering them more efficient. Additionally, the several component parts are constructed and arranged to eliminate disturbing effects caused by gyroscopic and transverse moments due to translation of the craft through the air.

In the operation of a helicopter, certain unique conditions are encountered that are not found in any other type of aircraft, either of the fixed or rotary wing type. Most of these conditions result from the fact that the sustaining rotor also propels the helicopter.

As the craft moves through the air, the rotor blades thereof on one side of the craft will be advancing into relatively retreating air and the blades on the other side of the craft will be retreating with the air. The path of the air through the rotor is into the top, down through the rotor disc and back into the slip stream. Thus, the path of the air through the plane of the rotor is directed backwardly and downwardly and has a different relative speed with respect to different blades at different points in their cycle of revolution. Inasmuch as the lift of a blade is a function of the square of the speed with respect to the air, the lift of the blade in the advancing portion of the cycle would be substantially in excess of the lift of the blade in a retreating portion of the cycle if the angle of incidence of the blade remained the same.

In the present invention, the control means act upon linkages to feather, or change the pitch, of the blades cyclically during each revolution so that the tip path plane of the rotor may be tilted with respect to the aircraft and with respect to the earth. Thus, the controls can be operated to change the thrust line of the rotor to provide a horizontal component of thrust which is used to propel the craft.

Gyroscopic and transverse moments have been substantially eliminated in the present invention by means associated with the control means mentioned above so that the blades may flap and/or feather to eliminate transient effects caused by gusty wind or the like so that the effect thereof will not upset the craft.

Accordingly, it is an object of the invention to provide an improved helicopter incorporating control means associated with the rotor structure for improving the operating characteristics of the craft.

It is a further object of the invention to provide an improved helicopter incorporating with the rotor system a simplified control and torque counteracting mechanism for improving the stability of the craft.

The foregoing and other objects, including the details of construction and arrangement of parts of the instant invention, will be either obvious or pointed out in the following specification and claims taken in view of the accompanying drawings, in which:

Fig. 12 is a diagrammatic view showing the total pitch control mechanism.

Fig. 13 is a diagrammatic view of the azimuthal control mechanism.

Fig. 15 is a detail sectional view of the tail rotor drive shaft suspension.

Fig. 16 is a view taken along the line 16—16 of Fig. 15.

Fig. 17 is a diagrammatic view of the helicopter as it appears when in the lifting state.

Fig. 18 is a diagrammatic view showing the rotor tilted.

Fig. 19 is a diagrammatic view showing the entire system in the state of accelerating.

Fig. 22 is a diagrammatic view including a chart and small figures representing rotor position demonstrating the lifting condition.

Fig. 23 is a diagrammatic view including charts showing the action which takes place upon tilting the rotor.

Figure 24:
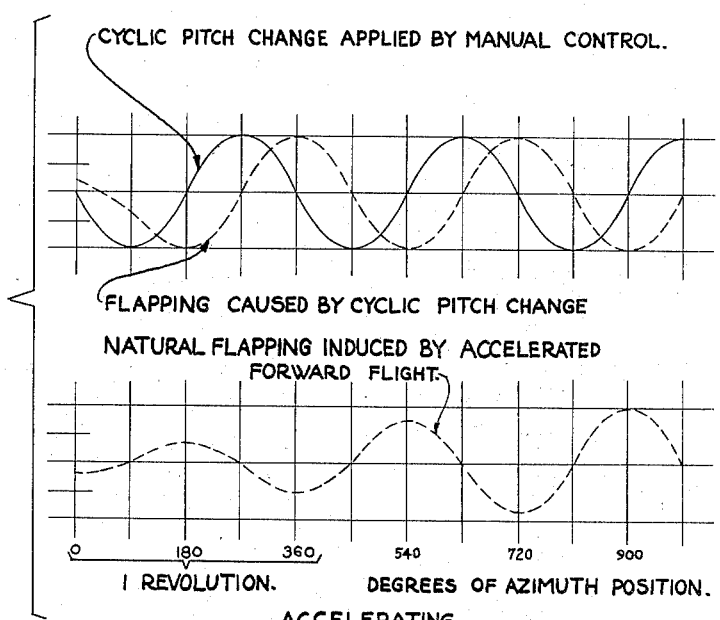
Figure 25:
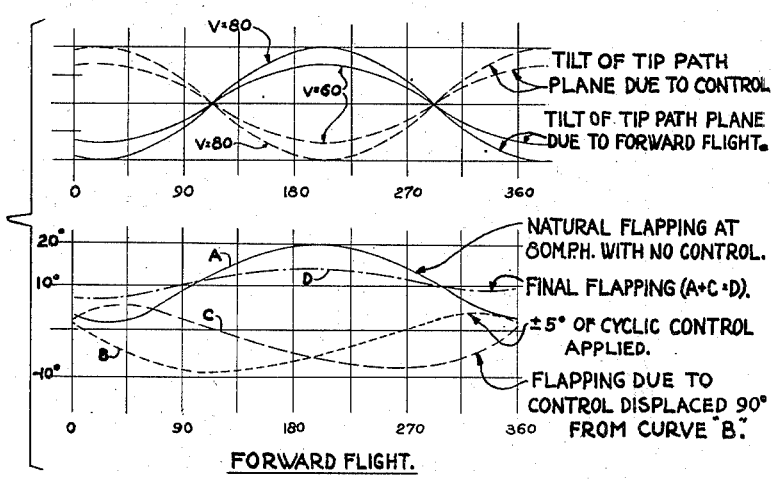

Fig. 24 comprises charts showing the action of a rotor blade upon accelerating, and Fig. 25 comprises charts showing the forces acting upon a rotor blade under constant speed conditions.

In describing my invention with reference to the accompanying drawings, it will be understood that all dimensions, capacities, and the like, are used illustratively only for one particular helicopter, to enable others skilled in the art to build and operate the same; and that craft of different dimensions, capacities, and the like, can be constructed by the use of present knowledge within the domain of one skilled in the aircraft arts, in view of the teachings herein presented by way of example.

Figure 1:
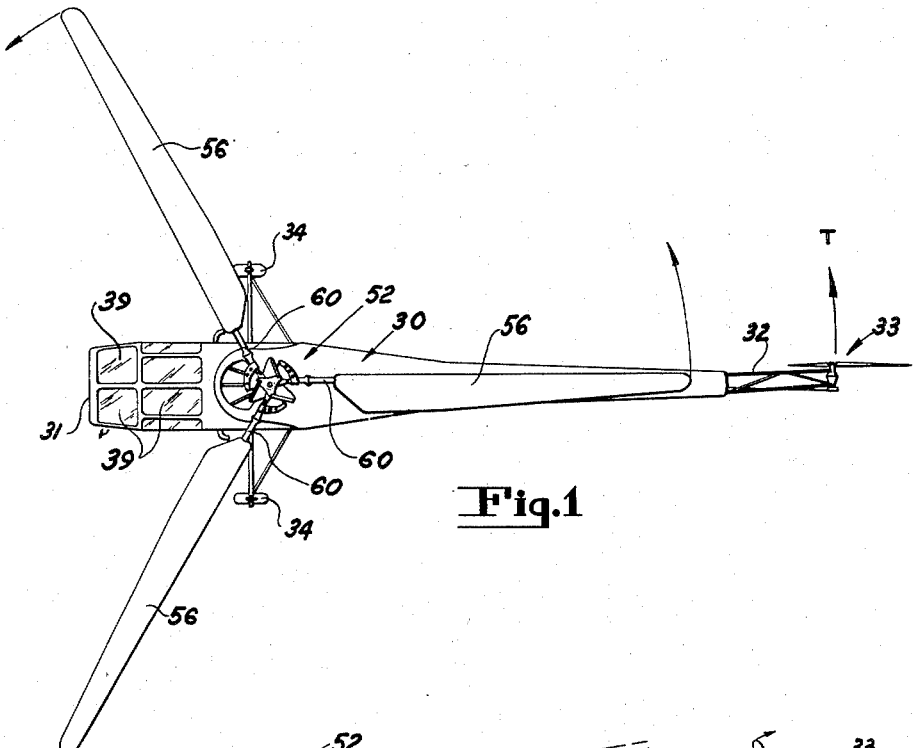
Fig. 1 is a plan view of the exterior of my improved helicopter.
Figure 2:
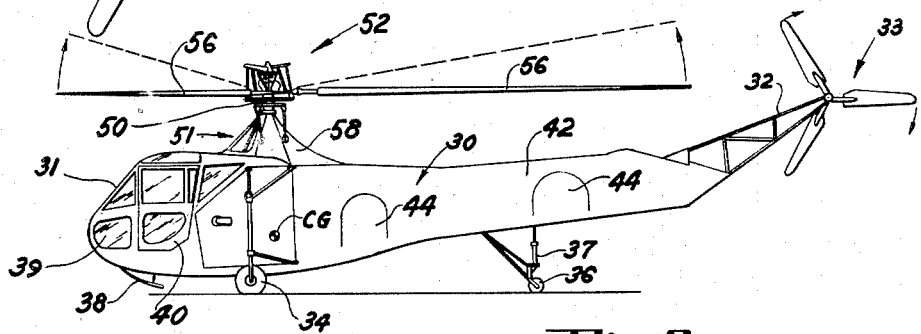
Fig. 2 is a side elevation thereof and Fig. 3 is a front elevation thereof.
Figure 3:
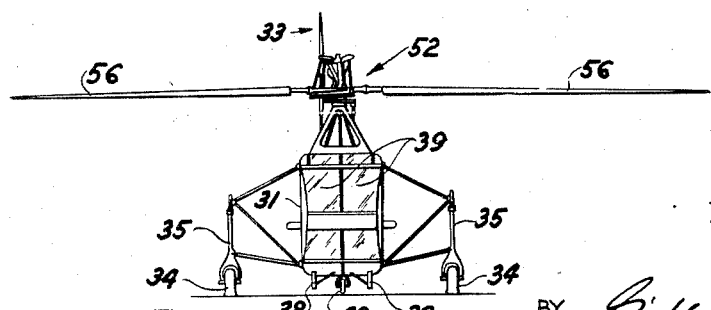

Figs. 1, 2 and 3 are plan, side elevational and front elevational views respectively of a helicopter equipped for operating from land. The helicopter has a body 30 having a forward section 31 in which the seats and the controls for the craft are contained, and an empennage section 32 upon which a torque compensating tail rotor 33 is mounted. At the sides of the central portion of the body 30, triangular framework is carried for mounting landing wheels 34. A wheel carrying framework for the wheels 34 includes shock struts 35 which absorb vibrations when the craft is standing upon the ground and the mechanism is in operation, and can also damp and cushion the same when the craft alights upon the ground. A tail wheel 36 is carried by framework secured to the body 30 and is also provided with a shock strut 37 for the same reasons. The tail wheel 36 can be placed at different positions without altering the operation of the craft. A nose skid 38 is provided to absorb shocks and prevent damage to the forward portion 31 of the craft in the event of a nose-down landing.

The forward portion 31 of the helicopter 30 is provided with panels of transparent material 39 at the tops and sides, and, if desired, at the bottom, so that the pilot and passengers have a large field of vision. A door 40 shown in Fig. 2 is one of a pair mounted in similar position on opposite sides of the forward portion 31 to provide access to the interior of the craft.

The balance of the craft is covered by doped fabric 42 to streamline the same. The covering 42 is provided with flaps 44 that may be closed by zipper closures or buttons or the like to provide access to the interior of the rearwardly extending portion of the craft 30.

The center of gravity of the craft has been indicated by the character CG in Fig. 2 and is substantially in alignment with a hollow drive shaft 50 from an engine, not shown, to a rotor head 52. The drive shaft 50 is journaled in a pylon 51 made up of structural members 54 (Fig. 7) that are welded to the framework of the center portion of the fuselage and arranged in a manner to be pointed out more fully hereinafter. The pylon is proportioned so that the rotor blades 56 carried by the rotor head 52 are approximately nine feet above the ground with the craft in the position shown in Fig. 2. The pylon is covered by doped fabric 58 that is faired into the covering 42 of the fuselage 30 to form a streamlined exterior for the helicopter body.

The rotor blades 56 may be constructed of fabric-covered framework, metal, plastic material, wood, or a suitable combination arrangement of these or other materials. The blades 56 in the instant helicopter are made up of fabric-covered structural members carried upon metal spars 60 that have a greater diameter at the root ends, and taper to a smaller diameter at the tip ends. The spars 60 are located at 25% of the chord and carry transverse ribs of airfoil section of the type known as N. A. C. A. 0012, suitably spaced to support a fabric cover. The leading edge of the blades 56 is made of wood and weighted so that the center of gravity of a blade 56 substantially coincides with the centerline of its spar 60. A blade 56 has an area of approximately twenty-two square feet. As viewed in plan, the blades are wider at their root ends and taper toward their tip ends. As constructed and arranged with three blades spaced radially 120 degrees apart around the drive shaft 50, the total blade area is approximately sixty-six square feet. The blades are of a length so that the diameter of the disc swept by them is approximately thirty-eight feet, and the disc area is approximately 1135 square feet. The rotor blade loading is approximately thirty-five to forty pounds per square foot depending upon the load of the helicopter, assuming a normal gross weight for the entire helicopter of between 2500 and 2600 pounds.

Figure 4:
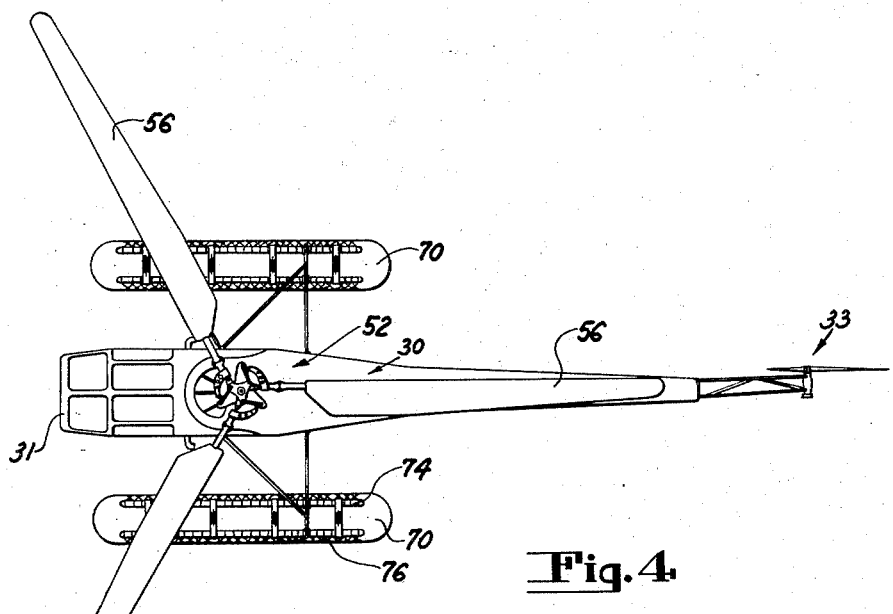
Figs. 4, 5 and 6 are views similar to Figs. 1, 2 and 3 but show the helicopter equipped with flotation gear.
Figure 5:
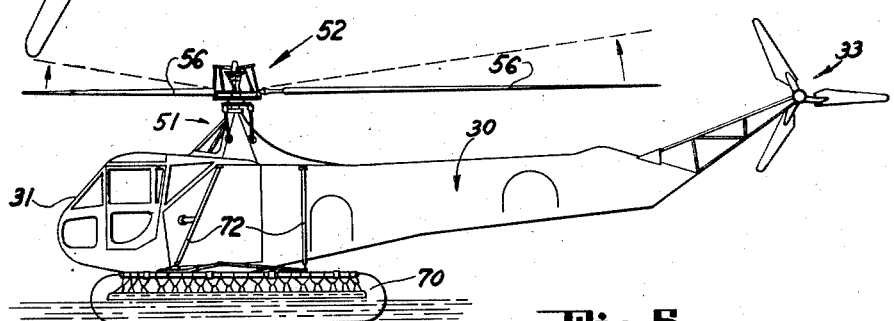
Figure 6:
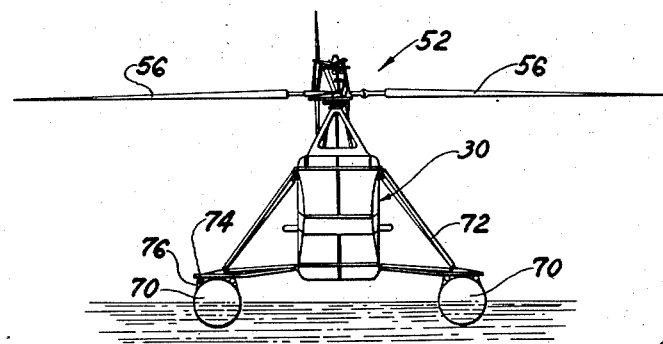

Figs. 4, 5 and 6 show the same helicopter except that landing wheels 34 are replaced by floats 70 for rendering the craft operable upon land or water. The floats 70 are mounted upon a triangular framework 72 fastened to lugs carried by the structural parts of the center portion of the body 30. At the lower end, the framework 72 supports a pair of longitudinally extending bars 74 that receive lacings 76 which fasten to eyelets carried by flaps forming part of the floats 70. The volume of the floats 70 is such that either one of them will displace a sufficient amount of water to offset the weight of the entire helicopter. Thus, when both floats are in engagement with the water, they will be substantially half submerged. When the helicopter alights upon water and engages one of the floats before the other, that float can become substantially fully submerged and will exert a righting moment upon the helicopter to bring the other float into engagement with the water. In the present structure, no shock struts are needed for landing the craft upon water because the action of the float in the water will serve to damp vibrations and to bring the craft down to a gentle landing upon the surface of the water. Suitable damping means, not shown, can be incorporated in the floats 70 or in the structure mounting the floats 70 upon the body 30 to render the same stable for alighting upon solid surfaces.

Figure 7:
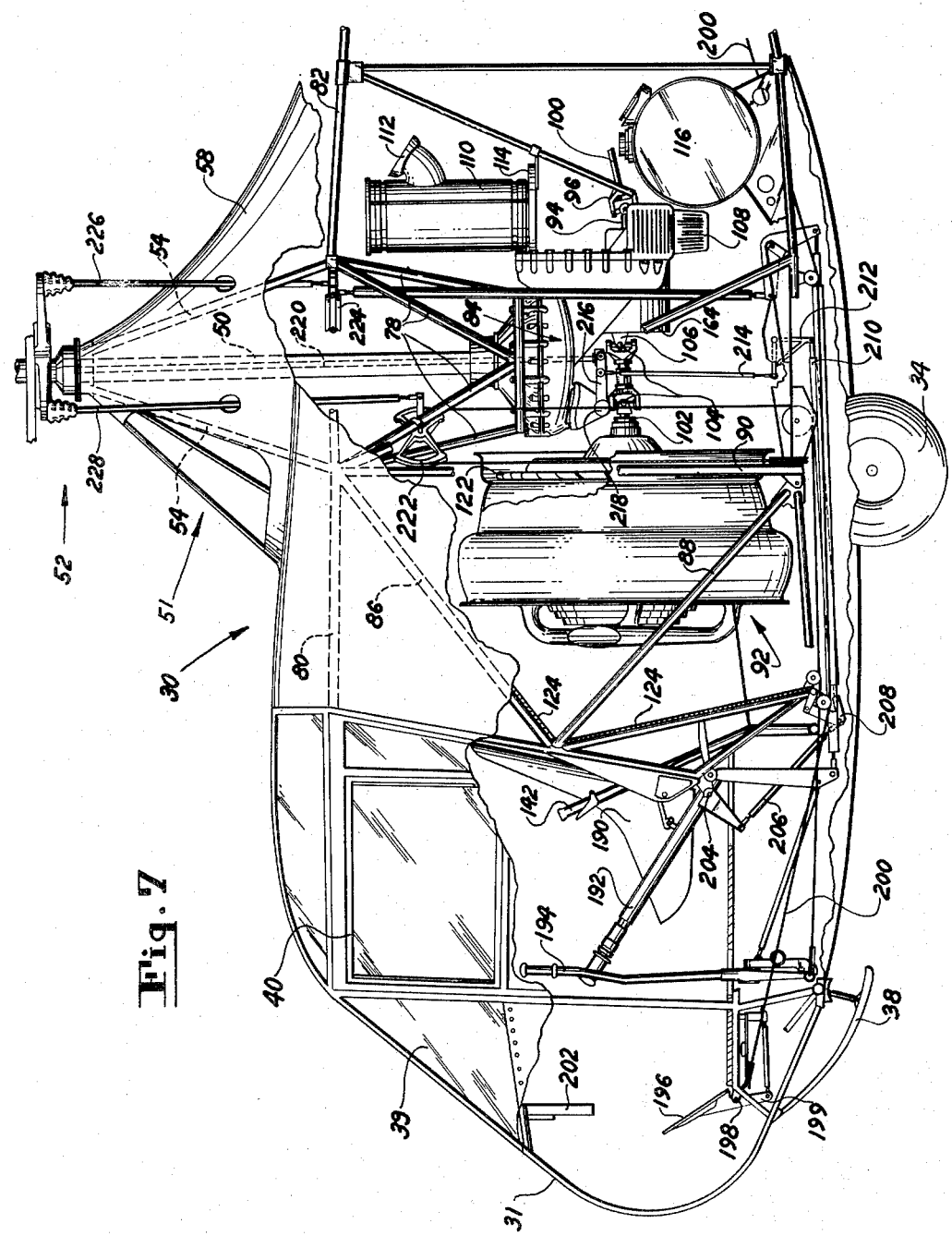
Fig. 7 is a side view of the front portion of the helicopter with parts broken away, and parts in section to show the construction and arrangement of parts of the control and motor drive mechanisms.

In Fig. 7, the central and forward portions of the fuselage are shown with parts broken away to show the mechanism and structure of the inside of the craft. The framing is built up of heavy tubing in the center portion (parts of which are shown) shaping the outside of the craft. Tubes extend inwardly and downwardly from the top truss members 80 and 82 to support the gear mechanism contained in a housing 84. The structural members 54 shaping the pylon extend upwardly from the members 80 and 82. Truss rods 86 and 88 extend forwardly and connect to a heavy vertical bar 90 at its ends. Lighter frame members are used to form the forward section 31 of the body, and lighter members also extend rearwardly to support the empennage structure 32. The framework carrying the landing wheels 34 is secured to lugs carried by the heavy center framing member.

The gear reduction mechanism 84 (Fig. 8) may be of any suitable type, and in the instant device provides a gear ratio of 9.336/1 for driving the rotor shaft 50. A higher speed portion of the gear reduction mechanism turns a shaft 94 connected by a universal joint 96 to the tail rotor drive shaft 100. Power enters the reduction gearing 84 through the shaft 106 driven by a shaft 102 through universal joints 104. An oil sump 108 is formed as a portion of the casing for the gear mechanism 84 and is equipped with fins for cooling the oil. An oil tank 110 (Fig. 7) which has a filling and air vent 112 is mounted upon a platform 114 carried by adjacent structural members of the fuselage. A fuel tank 116 is mounted upon the lower framing members for the body of the fuselage.

Figure 8:
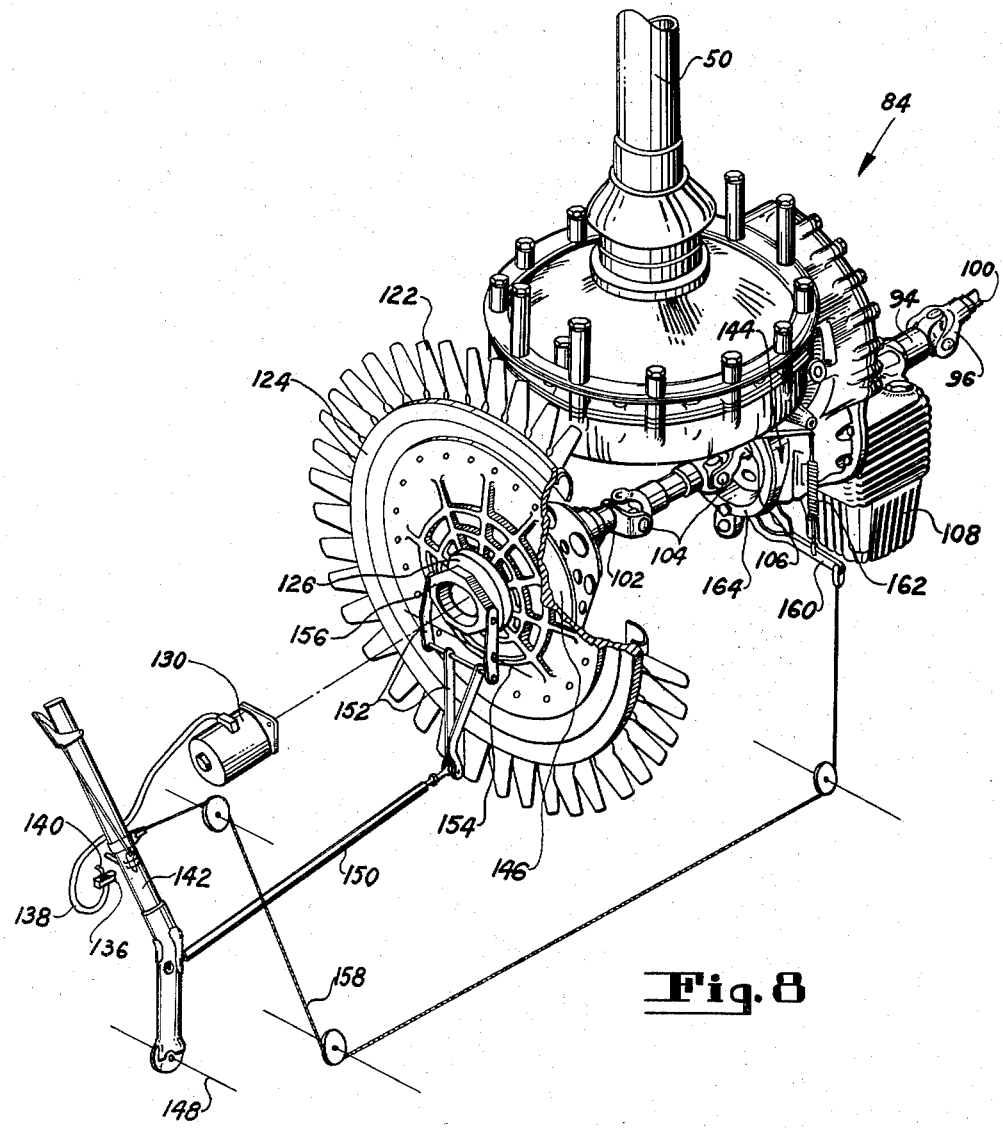
Fig. 8 is a perspective view of the gear mechanism and cooling fan and brake and clutch mechanism.

Cooling air for the engine 92 is drawn into the interior of the fuselage 30 through an opening in the forward portion of the pylon 51 (Fig. 7). The air travels downwardly and around the gear reduction mechanism and is drawn through the engine by a fan 122 mounted on the drive shaft of the engine (Figs. 7 and 8). The air, after passing the engine, is directed downwardly, or to the sides, by a firewall 124 which forms a partition between the center portion of the fuselage of the body 30 and the forward, occupant's, portion 22. Thereafter, the air may pass out of the fuselage through holes, not shown. The fan 122 is of the axial flow type having vanes 123.

An electric engine starter 130 (Fig. 8) is provided. A safety device is also provided so that the engine cannot be started when the clutch, to be described hereinafter, connecting the engine with the rotor gear mechanism 84, is engaged. The safety device comprises an electrical switch 136 connected by a cable 138 to the starter motor 130. Switch 136 has a lever 140 arranged for operation by the clutch-and-brake lever 142 pivoted at 148 and used by the operator to engage a rotor brake 144 for stopping the rotor, and for engaging the clutch 146 for driving the rotor. When the lever 142 is moved to the right as viewed in Fig. 8, it will cause a link 150 to be moved toward the right to rock a yoke 152 around a pivot 154 to move a collar 156 to engage the clutch 146 in a manner to be hereinafter more fully described. At the same time, a cable 158 will be slacked off to permit a lever 160 to be moved by the tension of a spring 162 to release a brake band in a brake mechanism 164 so that the brake is therefore released and the rotor drive shaft 50 may be turned. The arm 142 also has a neutral position in which the brake 164 is released and the clutch 146 is not engaged. The switch lever 140 engages the arm 142 so that the starter 130 can be operated only when the clutch 146 is disengaged.

Figure 9:
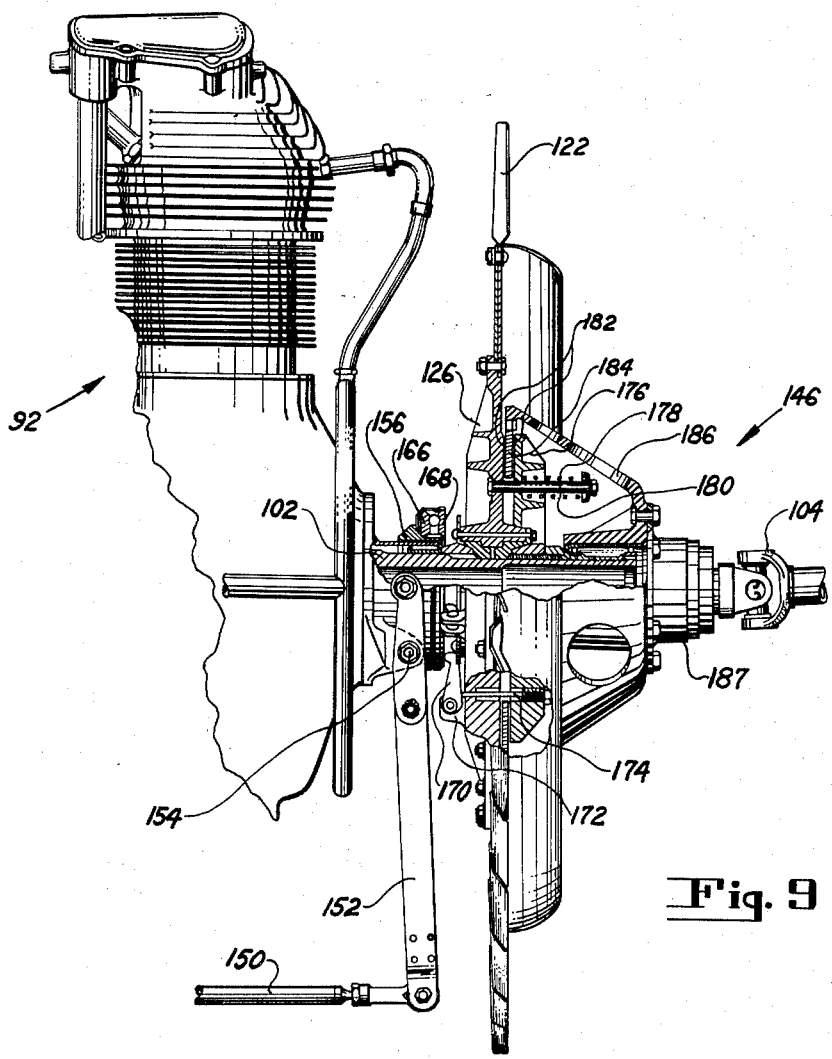
Fig. 9 is a view partly in section of the fan and clutch mechanism.

Fig. 9 shows a portion of the engine 92 and a section of the fan 122 and the clutch mechanism 146. Yoke lever 152 pivoted at 154 can move a collar 156 back and forth along the shaft of the engine 92. The collar 156 is secured to one race 166 of a ball bearing and holds the same non-rotatably. Another race 168 of the ball bearing is free to turn, and engages levers 170 carried by lugs 172 on the hub 126 of the fan 122. When collar 156 is moved toward the right, a series of pins 174 are moved toward the right to move a plate 176 toward the right against the tension of springs 178 carried upon pins 180 to disengage clutch surfaces 182 of a clutch plate 184 connected to a bell 186 of the clutch output side. The bell 186 drives a conventional free-wheel device 187, which in turn drives the universal joint 104 through shaft 102. Thus, when the lever 150 is moved toward the left as viewed in Figs. 8 and 9, the clutch surfaces 182 will be disengaged. When rod 150 is moved towards the right, the springs 178 will act upon the plate 176 to cause the clutch surfaces 182 to engage and the engine 92 will turn the bell 186 on the clutch output side.

Figure 14:
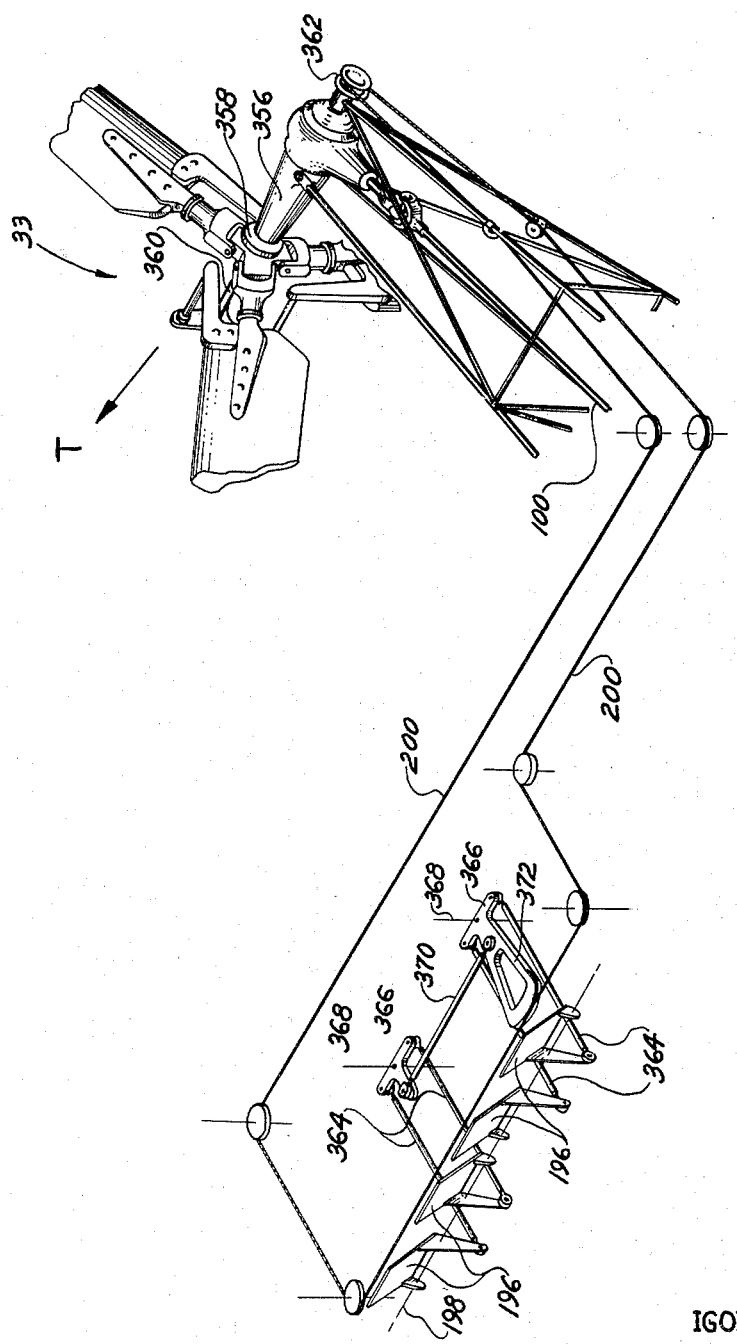
Fig. 14 is a diagrammatic view showing the tail rotor drive structure and its control mechanism.

Referring again to Fig. 7, the forward portion 31 of the body 30 contains two side-by-side seats 190 for the pilot and a passenger. An occupant of either seat can reach the clutch and brake lever 142, a total pitch lever 192 and an azimuthal control stick, or joy stick, 194, for controlling the direction of flight of the aircraft. Pedals 196 are arranged so that an occupant of either seat 190 can operate them with his feet (Fig. 14). The pedals 196 rotate upon pivots 198 to move a lever arm 199 to position a cable 200 leading through properly arranged pulleys to the tail rotor control to be described more fully hereinafter. An instrument panel 202 may contain motor speed indicators, rotor speed indicators, air speed indicators, gyroscopic equipment, ignition controls, a throttle, and other similar equipment found in most aircraft.

The total pitch lever 192 turns upon a pivot 204 secured to the frame and moves a series of rods and bell cranks 206, 208, 210, 212 and 214 to rock a link 216 pivoted at 218 on the housing of the reduction gear mechanism 84. Through this linkage, when the lever 192 is moved, a rod 220 extending through hollow drive shaft 50 to the rotor mechanism 52 will be moved to change the pitch of the blades 56 of the helicopter in a manner to be fully described hereinafter.

The joy stick 194, when moved, operates a first series of cables and levers through suitable pulleys and bell cranks to rock an arcuate segment 222 connected to a lateral control rod 228, and a second series of cables and levers connected to a lever 224 for raising and lowering a longitudinal control rod 226. The rods 226 and 228 control the fore and aft and right and left movements of the helicopter in response to the position of the joy stick 194.

Figure 10:
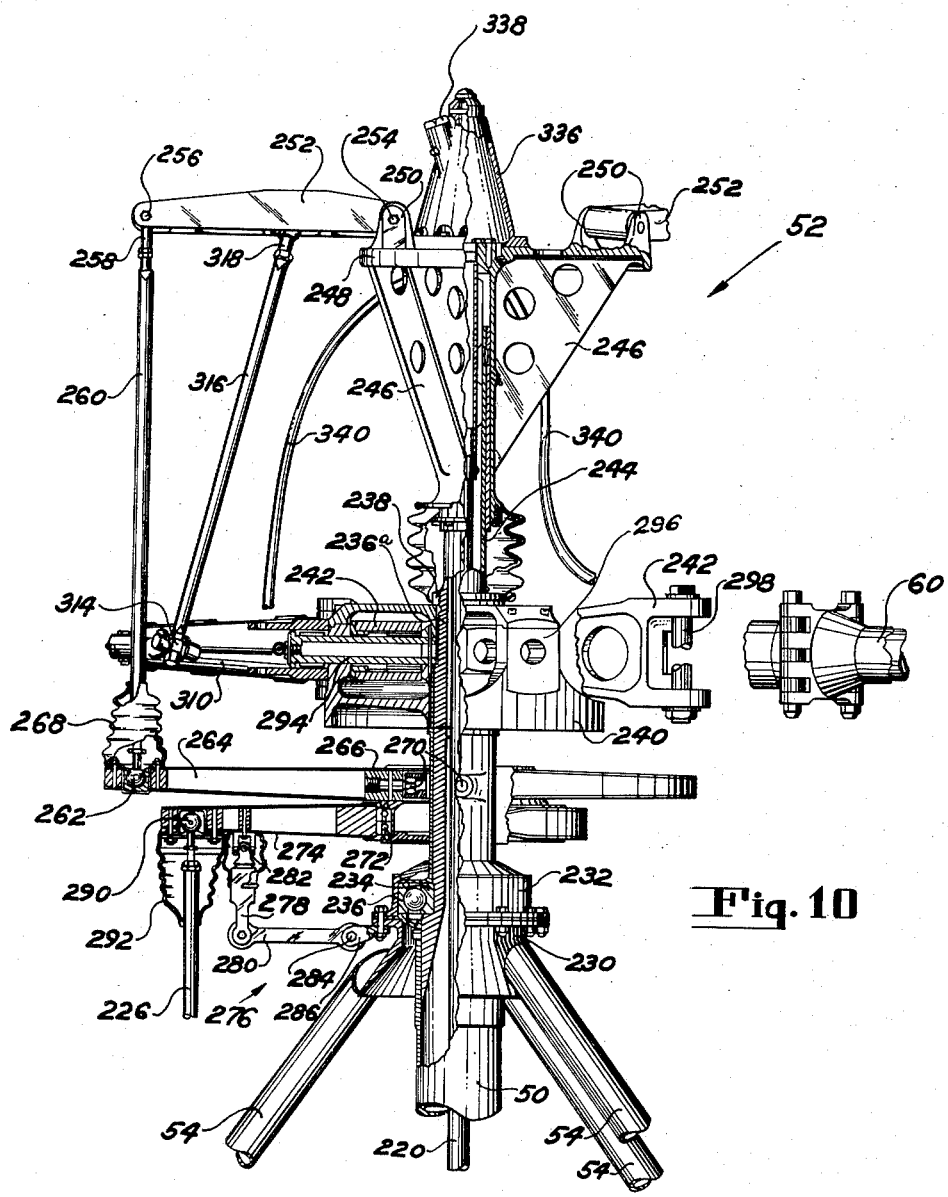
Fig. 10 is an elevational view, with parts in section, of the rotor head control and drive mechanism.
Figure 11:
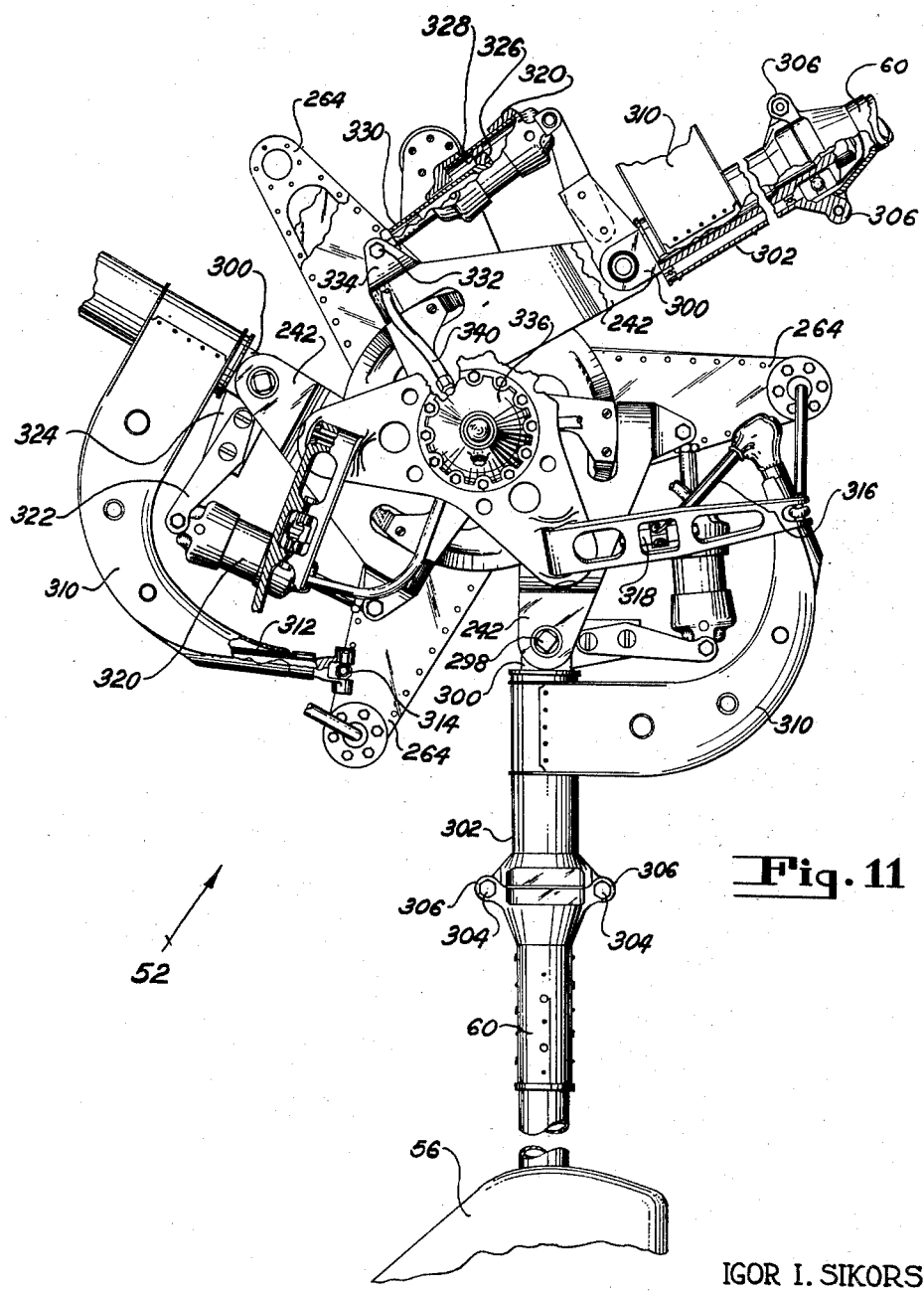
Fig. 11 is a plan view of the rotor head.

In Figs. 10 and 11, the details of construction of the rotor mechanism 52 are shown. The structural members 54 of the pylon are welded to a downwardly flared ring 230 forming a support for a cup 232. The cup 232 contains inner and outer ball races 234 and 236, the inner race 234 being secured to the drive shaft 50 and the outer race 236 being fitted to the interior of the cup 232. Secured by lock nut 238 at the top of shaft 50 upon splines 236a is a hub 240 which mounts flapping links 242 for turning the rotor blades 56. An upper extension 244 of the shaft 50 carries brackets 246 which turn with the shaft 50. The brackets 246 are formed of triangular members secured together at their tops by a plate 248 carrying pairs of lugs 250 and also secured together at their vertical edges by an axial tube which has a splined connection to shaft extension 244 permitting the brackets to be moved vertically as a unit by rod 220. The latter is connected to the bracket connecting plate 248 at its upper end. Rocker links 252 are carried by pivots 254 in the lugs 250. The links 252 have pivots 256 at their outer ends engaged by universal connections 258 of rods 260 which have ball universal joints 262 at their lower ends connected to the extremities of arms 264 of a three-pointed star 266. The ball joints 262 are protected from dirt and weather by flexible boots 268.

The star 266 is mounted upon the drive shaft 50 by a gimbal joint 270 so that when the shaft 50 is rotated, the star 266 rotates with it and is free to tilt about the pivots of the gimbal joint 270 in any direction. The star 266 carries upon a ball race 272 a pair of control arms 274 for controlling the angle of the star which arms are connected, respectively, to the upper ends of control rods 226 and 228. Arm 274 which is connected to control rod 226 is directed aft, while arm 274 which is connected to control rod 228 is directed laterally. The arms 274 are maintained non-rotatably with respect to the pylon of the helicopter body by a flexible linkage 276 comprising a knee joint made up of pivoted arms 278 and 280 swivelly connected at 282 to one arm 274 at one end and non-rotatably pivoted at the other end upon a pin 284 carried by lugs 286 bolted to the cup 232 and ring 230. By such an arrangement, the control arm 274 can be moved up and down and swivel freely upon the swivel joint 282 but the arms 274 cannot rotate with respect to the pylon. Thus, the star 266 will rotate with the shaft and carry the arm 260 with the shaft, the rocker arm 252 will be rotated by the upper part 244 of the shaft, and all of these parts will rotate at the same speed. The control arms 274, however, which connect to the stationary controls of the helicopter are held non-rotatably and the ball bearings 272 permit movement between the star 266 and the arms 274. At the outer extremities of the arms 274, the control arms 226 and 228 are mounted by ball joints 290. The ball joints are protected from dirt and from the weather by boots 292.

The flapping links 242 are mounted upon horizontal pins 294 secured to lugs 296 extending upwardly from the hub 240. The centerlines of the pivots 294 intersect the centerline of the shaft 50. With such structure, the flapping links 242 can move upwardly to permit the rotor blades 56 to assume a coning angle and to flap as they rotate. Vertical pins 298 have their centerlines at ninety degrees to the centerline of the pivots 294 and mount an internal shank 300 for the rotor blade stub shafts 302. The rotor blades 56 can move backwardly and forwardly about the pivots 298 in an action known as hunting, which action is restrained by dampers to be described hereinafter.

The stub shafts 302 are mounted upon bearings for rotating about the shanks 300. The bearing mounts have been shown partly in section in the upper right hand part of Fig. 11 and are arranged in compression in the inside of the stub shafts 302 to resist centrifugal forces and prevent the same from slipping off the shanks 300 while permitting rotation therebetween. The spars 60 of the rotor blades 56 are connected with the stub shafts 302 by pairs of bolts 304 which fit into meshing ears 306 carried by the spars 60 and the stub shafts 302. One of these bolts 304 can be removed, the arm 316 disconnected, and the entire blade 56 turned about the other bolt 304 to fold back against the fuselage 30 of the helicopter for placing the same in a hangar, or for storage.

When the stub shafts 302 are rotated on their own axes, the angles of incidence of the blades 56 are changed. Means for rotating the stub shafts are provided in the form of curved horns 310 secured to the stub shafts 302. The horns 310 are made up of upper and lower stampings welded together to form a hollow, strong and light structure. The outer ends of the horns are provided with bars 312 having universal pivots 314 at their outermost ends. The pivots 314 connect to rods 316 having universal pivots 318 at their upper ends connecting the rods 316 to points between the ends of the rocker arms 252. With such structure, if the rocker arms 252 are moved up or down at either of the pivot points 254 or 256, the rods 316 will raise or lower points 314 to rock horns 310 and change the angle of incidence of the rotor blades 56. As pointed out above, when the total pitch control rod 220 is moved, the brackets 246 will be moved accordingly upon the extension 244 of the drive shaft 50 and points 254 will be moved accordingly. At this time, the rocker arms 252 will pivot upon the points 256 and the rods 316 will act to move the horns 310 and change the pitch of all the rotor blades 56 simultaneously. When the azimuthal control rods 226 and 228 are moved, the control arms 274 will cause the star 266 to be tilted and the rods 260 will be moved up and down cyclically depending upon the tilt of the control mechanism. Thus, the points 256 will move up and down cyclically and the rocker arms 252 will pivot about the points 254 to cyclically move the rods 316 up and down to feather the rotor blades 56 cyclically in each revolution.

Referring again to Fig. 11, means to damp the hunting action hereinbefore mentioned are shown most clearly. Dash pots 320 are pivotally connected by their outer casings to arms 322 mounted upon angular extensions 324 secured to the shanks 300 of the blade structure. Thus, as the blades move back and forth, the arms 322 move back and forth a corresponding degree and pull the casing of the dash pot 320 in one direction or the other. The dash pots 320 contain pistons 326 having orifices 328 for passing fluid from one side of the piston 326 to the other. Piston rods 330 connect to the pistons 326 and are pivotally connected upon pins 332 mounted in pairs of ears 334 formed as lateral extensions of the flapping links 242. By such structure, as the blades 56 flap up and down in their cycle, the flapping links 242 also flap freely up and down and the dampers 320 are carried with them. If blades move back and forth, such motion will be damped by the dampers just described. Fluid to the dampers is supplied from a tank in the form of a bonnet 336 mounted on top of the brackets 246. A filler plug and air vent 338 is provided in the bonnet. The bonnet communicates through suitable passages with flexible tubes 340 which connect with the dash pots 320 through restricting valves not shown. The restricting valves are arranged to provide a pressure relief function to prevent damage to the rotor structure upon sudden shocks to different blades or other parts of the rotor mechanism.

In Fig. 12, the control means associated with the rotor head 52 for changing the lift of the rotor blades 56 is shown. When the total pitch lever 192 is raised, the lift of the rotor blades 56 will be increased by increasing the angle of incidence of the blades through linkage now to be described. The lever 192 will rotate around the pivot 204 to pull the rod 206 upward and to the left. Such motion of the rod 206 will cause the bell crank 208 to pull the rod 210 toward the left. The rod 210 will rotate the bell crank 212 in a clockwise direction to raise the rods 214. The lever 216 will be rotated by the rods 214 around the pivot 218 to raise the rod 220 connected to the plate 248 at the uppermost part of the control mechanism 52. When the plate 248 is raised, the rocker arm 252 will rotate about its point of attachment to the rod 260 which is maintained in a fixed position by the cyclical pitch mechanism to be described hereinafter. Thus, the rod 316 connected at a point between the ends of the rocker arm 252 will be raised. The rod 316 will pull up the horn 310 which will cause the spar 60 carrying the blade 56 to be rotated in a clockwise direction and increase its angle of incidence. With an increased angle of incidence for the blades 56, the lift thereof will be increased and more power will be absorbed by the rotor blades from the engine to raise the craft into the air.

When the total pitch lever 192 is pushed downwardly, the connecting linkage to the rod 220 will pull the rod 220 downwardly to lower the plate 248 of the rotor head 52 to push the rod 316 downwardly and lower the horn 310 to rotate the spar 60 of the rotor blade 56 in a counterclockwise direction and decrease the pitch thereof.

In Fig. 13, the cyclical pitch mechanism is shown. The joy stick 194 may be moved in any direction in azimuth. For forward components of movement, the joy stick 194 rotates about a pivot axis 195 to pull a rod 340 toward the left. The rod 340 will rock a lever 342 about a fixed pivot 344 and pull a rod 346 toward the left. The rod 346 will pull the lower arm of a bell crank 348 toward the left and rotate the upper arm upwardly to push a rod 350 upwardly. The arm 350 will push the lever 224 upwardly to raise the rod 226 connected to the aft arm 274 of the cyclic pitch mechanism. With the rod 226 raised, the tilt of the aft arm 274 will be up at the rear and down at the front. The two sides will remain at a neutral position and as the star arms 264 are turned by the shaft, they will reach a low point in their revolution as they point forwardly and a high point in their revolution as they point rearwardly. The arms 264 of the star will, when in the forward position, pull down the rod 260 to rock the arm 252 about its inner pivotal connection 254 to the plate 248, the position of which is controlled by the total pitch control arm 192 and described above. Hence, downward movement of the rod 260 will cause the rod 316 to move downwardly and rock the horn 310 downwardly to rotate the rotor blade 56 in a counterclockwise direction and decrease the pitch thereof. Inasmuch as the star arm 264 is at its lowest point when the arm is pointing forwardly, the rotor blade 56 will have its lowest angle of incidence at a point 90 degrees before the time that its longitudinal axis points forwardly of the craft (the horn 310 acts 90 degrees ahead of the blade position). When the pivot 314 for the horn 310 is in the rearmost position, the axis of the blade will be to the left of the craft and at its highest angle of incidence. By such an arrangement, when the craft is flying forward, because of a forward control movement of the joy stick 194, the blade 56 advancing into the wind has the smallest angle of incidence and the blade retreating with the wind will have the highest angle of incidence so that the tip path plane of the rotor mechanism will be inclined upwardly adjacent the rearward part of the ship, in a manner to be described more fully hereinafter, to give a forward component of lift to propel the craft.

To control the right and left components of movement of the craft, the joy stick 194 is moved to the right or to the left, and will rotate around pivots 352 to pull a cable 354 in one direction or the other. The cable 354 leads over suitable pulleys to the arcuate segment 222 for raising and lowering the control rod 228. As the joy stick 194 is moved toward the left, rod 228 is pulled downwardly to lower the control arm 274 which is disposed on the left hand side of the rotor head mechanism 52. By lowering the left hand side of the path of rotation of the star arms 264, the lowest angle of incidence of the rotor blade 56 will occur when the rotor blade 56 is at its forward position in alignment with the longitudinal axis of the craft because of the 90-degree displacement of the horn control point 314 with the longitudinal axis of the blade 56. The highest angle of incidence will occur when the rotor blade 56 is over the empennage portion of the helicopter and hence the tip path plane of the rotor will be inclined upwardly on the right hand side of the helicopter and downwardly at the left hand side, to give a horizontal component of the lift directed toward the left.

The above description of control effected by the joy stick 194 has been only of forward and backward and right and left movements. It will be understood, however, that a helicopter is capable of flight in any direction in azimuth with respect to the body of the helicopter. In order to effect operation in any desired direction, the operator needs only to move the joy stick 194 in the direction in which he wishes to go, and the tip path plane of the rotor blades will tilt so as to provide a horizontal component of lift in that direction. To obtain more or less lift from the rotor blades 56, the pilot changes the position of the total pitch rod 192, shown in Fig. 12, which opens the throttle so that more power from the engine is supplied to the rotor blades 56 and the angle of incidence of the blades is changed simultaneously to increase the lift. The above operations will be described more fully hereinafter in connection with the practical operation of the mechanism.

In Fig. 14, the construction of the tail rotor and the controls therefor is shown partly in detail and partly diagrammatically. Figs. 15 and 16 are detail views of the drive shaft support and aligning mechanism. In Fig. 14, the torque compensation rotor 33 is supported upon a housing 356 which contains a shaft turning a hub 358 to which the blades of the tail rotor 33 are hinged. The drive shaft within the housing 356 has a hole passing longitudinally therethrough through which a control rod 360 may be moved back and forth by a worm, not shown, turned by a wheel 362 operated by the cable 200. The details of construction of this mechanism will not be described because they can be of substantially the same form as that shown in Figs. 5 and 9 of Patent No. 2,318,259 mentioned hereinbefore, except that a worm is used to provide longitudinal movement of the control rod 360. The cable 200 is moved back and forth to change the angle of incidence of the rotor blades of the rotor 33 by the movement of pedals 196 located in the cockpit. As the pedals 196 are pushed downwardly, rods 364 rotate bell cranks 366 about fixed pivots 368. The bell cranks are connected by a rod 370 so that each of the pairs of pedals move simultaneously. The rod 370 rotates an arcuate segment 372 formed as an extension of one of the bell cranks 366 to move the cable to the right or to the left. Thus, as a left pedal is pushed downwardly, the cable 200 is moved in a direction so that the rod 360 of the tail rotor assembly moves outwardly to increase the pitch of the blades of the tail rotor to pull the empennage section of the heliward velocity will be at a rate determined by the difference in the power input to the rotor above or below that power required to sustain the craft, or 833 pounds per blade.

In Fig. 18, the attitude of several parts of the craft is shown when the tip path plane of the rotor blades 56 is being tilted forwardly to cause the craft thereafter to move in the forward direction. The operator will move the cyclic pitch control rod 194 forwardly. The star 266 (Fig. 10) will be tilted forwardly an amount in proportion to the tilt of the control rod 194 but not necessarily to the same extent. Upon tilting the star 266, the pitch of he blades 56 will be changed cyclically to cause the tip path plane of the rotor blades 56 to be tilted forwardly, and the blades 56 will rotate about a virtual axis of rotation, not in registry with the real axis of rotation containing the drive shaft. The universal blade mounts permit such action without stressing the blades 56 excessively. The tilting of the rotor mechanism, and the forces causing the same will be more fully described in connection with Fig. 23.

In Fig. 19, the action of the helicopter upon being accelerated is shown. The tip path plane of the rotor blades 56 is tilted forwardly from the vertical line and therefore will exert a horizontal component of force and cause the rotor system to be moved substantially horizontally through the air. Because of the inertia of the body 30 of the helicopter, the body will tilt forward much as a pendulum relative to an accelerated point of suspension. The amount of tilt is limited because of the connections of the flapping links to the rotor blades disposed on opposite sides of the rotor shaft (see Fig. 11). As the helicopter moves forwardly, there will also be a force present to cause it to move upwardly because the power required to sustain the craft will decrease as the speed of the craft increases. This force is present because when the helicopter is in forward motion there is an additional flow of air through the rotor due to this motion. It is a generally accepted fact that it takes less power to give a large mass of air a small increment of velocity than to give a small mass of air a large increment of velocity. Thus, as the rotor is tilted and moves with respect to the relative wind, a larger mass of air passes through it. Up to speeds of 40 to 50 miles per hour, before the drag of the rotor and fuselage have serious effect, the power required will be substantially reduced over that power required for sustaining the craft at zero air speed. Beyond this speed, however, the power required will again increase due to the predominating influence of rotor and fuselage drag.

Due to the forward tilt of the body 30 of the helicopter, the tilt mechanism including star plate 266 will be tilted forwardly with respect to the tip path plane of the rotor blades 56. This tilting of the mechanism will be a function of the tilt of the body 30 around the point of support of the rotor blades 56. The rate of change of the tilting of the body is very important in the present invention because, within limits, it provides a definite time element for the pilot to react.

When the body 30 of the helicopter tilts into the position shown in Fig. 19, the cyclic pitch control rod 194 can be moved toward its original position with respect to the fuselage. It will be noted, however, that in this position with respect to the fuselage, the stick is still tilted with respect to a line normal to the flight path. When enough altitude is attained in the climb condition, the total pitch is reduced by control rod 192 which is moved from the full-line position shown to a position in which the pitch and power available to the rotor blades 56 equals that required for level flight.

Figure 20:
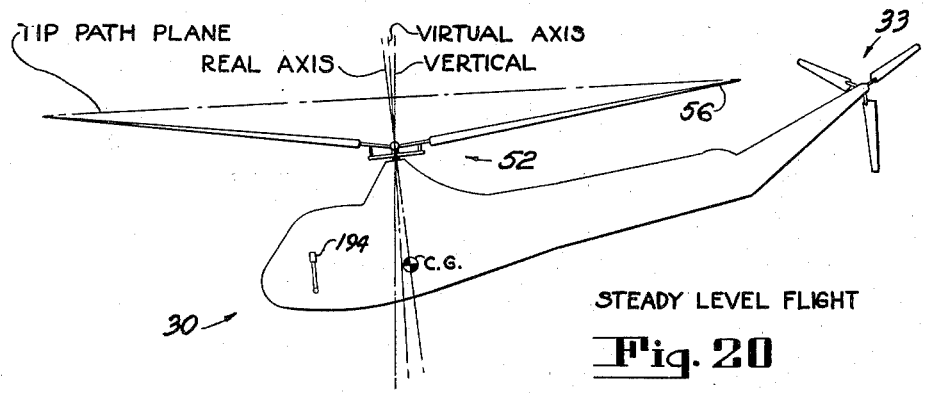
Fig. 20 is a diagrammatic view showing the entire system under constant speed conditions.
Figure 20A:
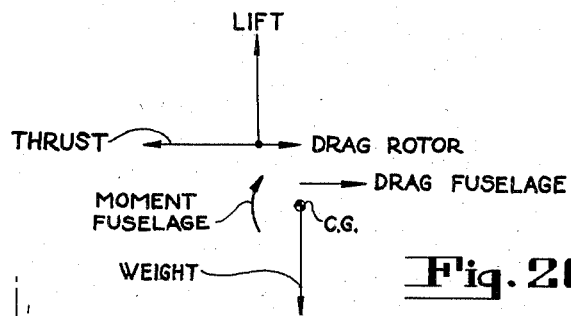
Fig. 20a is a force vector diagram.

In Fig. 20, an exaggerated condition of the attitude of the helicopter in level flight has been shown. In this condition, the direction of motion of the entire craft is directly forward. The drag of the relative wind upon the fuselage and surrounding structure will cause the center of gravity of the craft to be swung backwardly with respect to the point of support at the center of the rotor. The tilting mechanism star plate 266 may be substantially parallel to the longitudinal axis of the body of the helicopter but is tilted with respect to the horizon. Under such conditions, the rotor blades 56 will exert a horizontal component of thrust in the same direction as the flight of the helicopter and this force will be opposed by the drag acting upon the body of the helicopter and the horizontal component of rotor drag. The balances of forces is more clearly illustrated in the diagram Fig. 20a. The thrust will draw the craft forward increasing the drag of the rotor and the drag of the fuselage until their sums equal the propulsive thrust vector. The tilt will always be such that the moment around the center of gravity of the fuselage and the couples of lift-weight and thrust-drag will equalize. The different actions will be described more fully in connection with Fig. 25.

Figure 21:
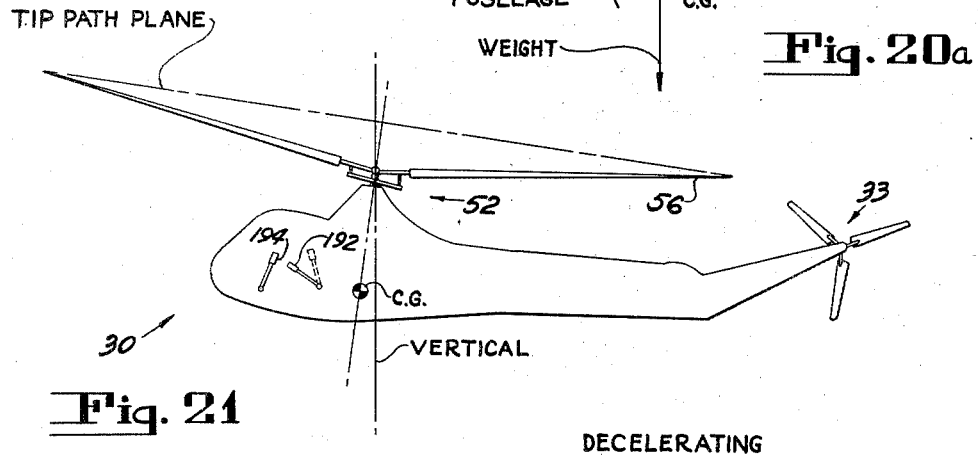
Fig. 21 is a diagrammatic view showing the system in the decelerating condition.

In Fig. 21, the attitude of the helicopter upon decelerating is shown diagrammatically and exaggerated somewhat for clarity. The control rod 194 is moved rearwardly to cause the tilt mechanism to tilt rearwardly with respect to the body of the helicopter and in some cases of decelerated flight with respect to a line that is normal to the horizon. The action of the tilt mechanism will be to cause the tip path plane of the blades to be opposite to that discussed in connection with Fig. 18 and a rearwardly directed component of thrust will be exerted by the rotor blades to cause the helicopter to decelerate. When decelerating from speed of minimum power to substantially zero air speed, the total pitch rod 192 will be moved from the full-line position shown up to the dotted-line position to increase the total pitch of and power available to the blades 56 to maintain the helicopter at a given altitude. The reason for increasing the pitch is because when the helicopter slows down with respect to the supporting air, the power necessary to sustain the craft will be increased for the same reasons as pointed out in connection with Fig. 19 when the craft is accelerated except that the action of the controls will be reversed.

From the foregoing, the broad principles of operation of a helicopter will be clear, and the reasons attendant the fact that the helicopter can lift a greater load when taking off in a relatively high wind are also made clear, since relative wind and not absolute motion determines the lift. The details of functioning of different parts described above will be set out below in connection with charts which illustrate these principles.

Fig. 22 is a chart having as a base the degrees from zero to 360 of rotation of the rotor blades 56 with respect to the body 30 of the helicopter. Thus, at zero degrees, the rotor blade 56 is directed toward the tail rotor 33. At 90 degrees, in the direction of rotation, the rotor 56 is at the right of the body 30 of the helicopter. At 180 degrees, the rotor 56 is forward of the body of the helicopter. At 270 degrees, the rotor blade copter toward the right and thus give a left heading to the helicopter. As the right pedals are pushed downwardly, the pitch of the rotor blades are decreased or reversed to give a right heading.

The normal angle of incidence or pitch of blades of the tail rotor 33 is such that a thrust is exerted to oppose the torque rotating the main rotor blades 56. The direction of this thrust lies substantially in the plane of the main rotor. As viewed in Fig. 1, the main rotor blades are turning in a counterclockwise direction which would tend to rotate the body of the helicopter in a clockwise direction. Thus, the normal thrust of the torque compensating tail rotor 33 is in a direction indicated in Figs. 1 and 14 by the character T. As more power is applied to the main rotor, the torque compensating rotor 33 will require more power to offset the increased main rotor torque in order to prevent rotation of the body of the helicopter. The operator at such time will apply more left pedal to increase the pitch of the blades of the tail rotor 33.

The torque forces in the main rotor create a couple, and the thrust T of the tail rotor 33 exerts a single force. Since a couple cannot be neutralized by a single force, a tendency remains to translate the helicopter laterally toward the top of the sheet as viewed in Fig. 1, for example. To prevent such movement of the craft, the cyclic pitch control mechanism illustrated in Fig. 13 is slightly offset by adjustment of the length of rod 228 to give a left hand component of thrust of the main rotor to counterbalance this translating force to the right exerted by the tail rotor 33. The control linkage is arranged so that with the joy stick in the vertical position, the tilting mechanism is inclined downwardly to the left. Hence, the tip path plane of the rotor will be inclined to the left, and a left lateral component of thrust opposing the thrust of the rotor 33 to the right will be obtained. The condition can also be compensated by placing the center of gravity of the craft to the left, by building a tilt into the entire rotor head mechanism 52, or by other means, if desired, without departing from the scope of the present invention.

To support the drive shaft 100 for the tail rotor 33, a novel vibration absorbing and readily adjustable sling arrangement comprising three adjustable arms is provided. A typical section of the empennage portion of the helicopter is shown in Fig. 15 and comprises the longitudinal structural members 82 having struts 380 for transversely bracing the structure and for providing a point of support in the form of a gusset 382 at the bottom of the fuselage. Upper gussets 384 form points of support for upper tie rods 386 supporting a plate 388. A lower tie rod 390 connects to the gusset 382 and to the lower part of the plate 388. The plate 388 carries a pair of retaining rings 392 for supporting a self-aligning bearing 394. The inner race of the bearing 394 supports the drive shaft 100. With the instant structure, the drive shaft 100 can be readily aligned and solidly supported for its entire length by adjusting the tie rods 386 and 390 which are provided with turn-buckle attachments. Such structure absorbs shaft vibrations also, and prevents them from vibrating the forward parts of the helicopter.

*Power-on operation*

In the operation of the helicopter disclosed above, the novel control mechanism and the arrangement and functions of the rotor blades 56 render the helicopter rotor and body combination fully controllable for reasons to be pointed out below.

In the conditions to be explained hereinafter, the action of the tail rotor 33 will not be described, but it is to be understood that for control about the vertical axis of the craft, the pitch of the tail rotor 33 can be changed; and for compensating different torques of the main rotor, the pitch can also be changed. It is to be noted that when the helicopter is in forward flight, the action of the air passing over the fuselage and tail rotor will offset the torque of the rotor blades 56 to some extent so that the pitch of, and the power absorbed by, the tail rotor 33 may be reduced.

In the following description of the operation of the device, the tilting of the tip path plane of the main rotor 56 has been exaggerated in Figs. 17 through 21, inclusive, and the angle of incidence of the rotor blades 56, has been arbitrarily selected for the purpose of setting forth an example. The curves selected are merely illustrative of the operation of the device, and in actual operation, the true curves for a given flight condition will only approximate the character of the curves shown in Figs. 23 through 25. Also, in these curves, the dynamic angular accelerations and forces created in the rotor system which reflect upon the body 30 of the helicopter have not been considered. In actual practice, however, these dynamic moments have effects upon the operation of the craft, and will be explained after the description of the underlying principles of operation represented in Figs. 17 through 25 have been discussed.

In Fig. 17, the helicopter is shown in the attitude it would assume when being lifted vertically from the ground by the action of the rotor blades 56. The angle of incidence of the blades 56 will be increased by moving the control lever 192 from the full-line position shown to the dotted line position. The action of the lever 192 is to increase the angle of incidence of the blades 56 and simultaneously increase the power output of the engine 92 through control linkages to the throttle, not shown, but described in Patent No. 2,318,259 mentioned above. As the helicopter is on the ground, when the angle of incidence of the blades 56 is increased, the blades will cone upwardly into an attitude indicated by the position shown diagrammatically in Fig. 17. At constant R. P. M., as more and more angle of incidence is given to the blades, the tip path plane of the rotor blades 56 will be moved upwardly. The exact angle of the cone and position of the tip path plane is determined by the lift of the blades 56 and the centrifugal forces acting thereupon as opposed by the weight of the craft and any acceleration forces that modify such weight. Thus, the total lift of all the blades is always equal and opposite the full weight of the craft when in unaccelerated flight.

When the lift of the blades 56 is sufficient, the helicopter will be raised from the ground. Assuming that the helicopter at take-off weighs 2,499 pounds, the lift of each of the three blades will be 833 pounds to exactly equal this weight. Thus, to maintain a hovering condition, a sufficient angle of incidence and power input to the rotor must be provided to exactly equal the force due to gravity. As the power input to the rotor blades increases above such value, the helicopter will be moved upwardly, and as the forces diminish below this value, the helicopter will move downwardly. In either case, the upward or down- 56 is at the left of the body of the helicopter. At 360 degrees, the position of the rotor 56 is the same as at zero degrees and a new cycle will begin. Also shown in Fig. 22 are small sections of the rotor blade 56 at the angle of incidence, the angle between the line of no lift of the airfoil element, and the plane normal to the rotor shaft, that they will have at various places in the cycle of revolution when the helicpoter is in the hovering condition at zero air speed. A horizontal line bears the character 833 which represents the pounds of lift exerted by a given rotor blade to sustain the helicopter in opposition to the force due to gravity acting upon the helicopter. The angle of incidence of the blade is shown as being 10 degrees. It will be understood, however, that for different loadings and for different craft under different conditions, this angle of incidence may be different to sustain the craft. It will be noted that the angle of incidence is substantially ten degrees at the zero-degrees station and also at the 90, 180, 270 and 360-degree stations, when the center of gravity is in such a position longitudinally and laterally that the virtual and real axis of rotation are coincident. Such representation shows that in hovering, or lifting the helicopter directly upwardly in still air, the total pitch lever 192 is the only one used because the angle of incidence of a blade 56 is the same through its entire cycle and no cyclic pitch is required.

In Fig. 23, at the top, the angle of incidence of the blades at several positions caused by a forward displacement of the control of the cyclic pitch system is shown. At zero degrees, the angle of incidence is shown as 10 degrees. At 90 degrees, the angle of incidence is shown as 5 degrees. At 180 degrees, the angle of incidence is shown as 10 degrees. At 270 degrees, the angle of incidence is shown as 15 degrees. At 360 degrees, which corresponds to the zero-degree position, the angle of incidence is back to 10 degrees. A sinusoidal curve appears at the center of the Fig. 23 and shows that the angle of incidence will change in a sinusoidal manner to a degree determined by the tilting of the tilt mechanism, referred to in connection with the explanation of Fig. 18 and shown in detail in Figs. 10 and 13.

When the cyclic angle of incidence of the rotor blade 56 is changed, the lift of the blade will change and cause the entire blade to move up or down depending upon whether or not the angle of incidence is more or less than the arbitrarily selected angle of incidence of 10 degrees as represented in Fig. 23. Thus, between azimuth angles of zero degrees and 180 degrees, the angle of incidence of the blade 56 is less than 10 degrees and the direction of motion of the rotor blade will be downwardly. When the angle of incidence of the blade 56 is greater than 10 degrees, the blade will lift upwardly. It has been found that the maximum displacement occurs substantially 90 degrees later than maximum blade pitch. As shown at the bottom part of Fig. 23, the cyclic pitch change motion is represented by a sinusoidal curve which moves below and above the position providing 833 pounds of lift for the rotor blade. Thus, when the lift of the rotor blade is less than 833 pounds, centrifugal forces acting in the rotor system will oppose the lift and inertia forces to cause the blade to move downwardly. As the lift of the rotor blade exceeds 833 pounds, the air force on the blade will oppose the centrifugal and inertia forces to raise the blade upwardly.

The result will be that the tip path plane of the rotor blade 56 will be tilted out of a plane perpendicular to the shaft. The full amount of tilting will occur almost immediately after control is applied and has been found in practice to have but a very slight time lag. The reason for this is that even though a constant cyclic pitch change is introduced, the inertia and centrifugal forces of the blade cause it to climb up to a new position with a time delay, and has been found to be approximately equal to the time required for the blade 56 to travel through 90 degrees of azimuth.

The blade motion of Fig. 23 is shown through several revolutions of a rotor blade and lagging one fourth of a revolution behind the cyclic pitch displacement which is substantially an instantaneous action. In other words, for any cyclic pitch change, the rotor blade will thereafter move up and down to tilt the tip path plane of the rotor as a cosine function of the tilting of the cyclic pich control means because the lift of the blades in advancing and retreating portions of the cycle, for example, will vary substantially as a cosine function of the pitch change. It is to be noted that this cosine function is also a rate of change function from the calculus point of view which has an amplitude controlled by the manual means within certain limits. These limits are controlled by that characteristic that as a greater lift occurs due to the increased blade angle, the blade will move upwardly out of its original tip path plane. This action is counteracted by the inertia of the blade and the centrifugal restoring forces, which tend to keep the tip path plane of the blades at right angles to the axis of rotation.

In Fig. 24, the cyclic pitch change required to accelerate the body of the helicopter is shown diagrammatically at the top. The cyclic pitch change line is a uniform sinusoidal curve of given amplitude. Because the body of the helicopter 30 will tilt forward at a rate determined by the distance from the point of support at the rotor blades to the center of gravity, and the pitching moment of inertia of the fuselage, the tilt mechanism will be further tipped in space due to the momentum of the fuselage in the pitching direction. This tilting of the rotor shaft axis will act with the cyclic pitch change in order to incline the rotor to a greater degree with respect to the horizon.

For most satisfactory operation, the rate of change of tilting of the tip path plane of the rotor blades under the control of the pilot should be faster than the rate of change of tilting of the rotor shaft due to fuselage inertia and drag. As the distance from the point of support of the helicopter to its center of gravity is decreased, the tilting of the rotor shaft axis due to body inertia and drag will be at a smaller rate and will provide initially a smaller tilting of the rotor drive shaft axis. As the center of gravity of the helicopter is moved farther and farther from the point of support the rate of change of the tilting of the rotor drive shaft axis will be faster and the acceleration of the craft will accordingly be faster due to this inertia function in changing the inclination of the whole rotor.

The tilting of the rotor shaft, due to the body inertia, upon initially starting the helicopter differs from the tilting which occurs upon changing speed at high speeds because of the drag upon the fuselage. Due to the rearwardly moving air this drag will cause a greater tilt at higher speeds because such a drag is a non-linear function of air speed. The tilt of the rotor axis due to drag combines with the tilt of the ship due to body inertia to give a resultant final inclination. By selecting a fuselage of the proper drag characteristics and with a proper pendular period due to the spacing of the point of support and the center of gravity, any required amount of anticipation of the control functions may be obtained and the craft may be flown with the azimuthal control rod 194 in the vertical position with the drag of the rotor and fuselage offsetting the horizontal component of thrust of the rotor to obtain the proper tilt of the helicopter, (see Fig. 20a).

If the drag of the fuselage is very low at high speeds, the rotor must necessarily be tilted forward by the cyclic controls only, without benefit of the fuselage drag, with the result that a long control stick travel is necessary which may be inconvenient to the pilot. The large flapping which could result from such a disarrangement or misalignment of the real and virtual axes of the rotor may cause an uncomfortable vibration in the craft as well as high stresses in the blade parts.

At the top of Fig. 24, the movement of the blades due to the control applied during hovering is shown. Such blade movement will cause forward motion. However, in Fig. 24, at the bottom it is seen that the motion of the blade due to the relative wind of forward flight is 180 degrees out of phase with the curve above of the blade movement due to manual control. As the aircraft moves forward in the relative wind, for any given point on the blade, the air velocity on the advancing side of the rotor will be greater by twice the increment of forward speed than the air velocity on the retreating side of the rotor. Consequently, if the blade were rigidly connected to the rotor hub 52, it would produce a greater thrust due to its relatively greater air speed. However, as the blade is hinged to the hub, the increased velocity is compensated for by an upward velocity of the blade on the advancing side of the rotor, decreasing the angle of attack, and consequently the lift, on the advancing blade. Conversely, the blade flaps down on the retreating side producing a component of relative wind upward increasing the angle of attack and consequently the lift. In this manner the lifts and the lift moments about the flapping hinge of the advancing and retreating blades are equalized so that there are no resultant laterally overturning moments applied to the rotor shaft.

The high point of the travel with respect to the plane perpendicular to the rotor shaft is reached substantially at 180 degrees of azimuth position and the low point is reached at about zero or 360 degrees azimuth. The maximum velocity of the blade upward is at the 90-degree position while the maximum velocity downward is at the 270-degree position.

Thus, it can be seen that the blade movement due to relative wind will be opposite to the blade movement due to the manual cyclic pitch change. The blade movement due to the relative wind will tend to incline the tip path of the blade back from its original inclination. This action, however, is not sufficient to overcome the general tilt of the tip path plane with respect to the horizon caused by cyclic pitch control which is required for the necessary inclination of the thrust vector to provide propulsion in forward flight.

Under normal conditions of center of gravity location, when accelerating from zero air speed to high speed in forward flight, the amplitude of flapping due to the relative wind is initially smaller than the flapping due to the displacement of the manual control means. After a certain critical velocity has been reached where the two are substantially equal and cancel themselves out, the flapping due to the relative wind may be substantially of a greater displacement than the flapping due to the cyclic pitch change with respect to the fuselage. This will occur only under proper conditions of fuselage drag, center of gravity location, and fuselage pitching moment of inertia, as these effects will tend to maintain the tilt of the aircraft with respect to the horizon in spite of rearward tilting of the tip path plane. Therefore, it will be understood that variations of center of gravity location, fuselage drag and pitching moment may be made to alter the flapping characteristics, other than the general case described above.

In the formula in keeping with present knowledge of action of lifting of an airfoil section, lift is equal to the coefficient of lift, times one-half the air density, times the projected area of the airfoil section, times the final velocity squared. If the instant helicopter is hovering or in vertical flight, the manual control means changes the angle of incidence of the blade 56 within its operating range and therefore changes the lift coefficient of such blade which changes the total lift of the blade in substantially a linear manner. However, when the air speed of the craft builds up, the rate of change of this lift is substantially a velocity squared function and therefore, if the blade were not hinged, the lift of a blade 56 due to the relative wind would vary with the square of the sum of the forward speed increment algebraically added to the rotational velocity. Thus, the magnitude of the flapping displacement which is caused by forward speed is a non-linear velocity function. As the lift is dependent on the square of the final velocity of the blade, the flapping which must equalize this lift, therefore, depends on the difference of the square of the speed of the advancing and retreating blade. Thus, at low forward speed (where the increment velocity due to forward speed which is added to the velocity of the advancing blade and subtracted from the velocity of the retreating blade is relatively small) the flapping displacement caused by relative wind will be small. When the helicopter attains a higher velocity, however, the flapping will increase as the differences of the squares of the final velocities of the advancing and retreating blades. At a certain forward speed this may equal the flapping which results from the application of the cyclic control necessary to accelerate the helicopter in the air. The velocity of the helicopter will continue to increase until the speed is reached, where the flapping caused by the above differences of relative velocity, counteracts the setting of the manual controls so that at a given tilt of the fuselage, the helicopter may fly with a constant velocity with little or no appreciable flapping of blades. The building up of flapping amplitude with increasing speed is represented in the lower part of Fig. 24.

Fig. 25 shows a curve for relative wind and manual control effecting the tilt of the tip path plane of a rotor blade for one revolution thereof. The solid line curves are shown for steady forward velocities of 60 and 80 miles per hour. These curves are substantially sinusoidal, differing only in amplitude. The tilt of the tip path plane due to manual control has been shown as sinusoidal curves opposite in phase to the relative wind induced curves, and similarly differing in amplitude for 60 and 80 miles per hour values.

In actual level flight the forward tilt of the tip path plane due to the control for a given velocity may under certain conditions be equal and opposite to the tilt of the tip path plane backward due to the relative wind with respect to the fuselage. Thus, for a given velocity, there may be no tilt of the rotor tip path plane with respect to the plane perpendicular to the rotor shaft. The forward component of thrust of the rotor will be equal and opposite to the sum of the drag acting upon the body of the helicopter 30 and the horizontal component of rotor drag. Assuming that the control column is held in a fixed position for level flight, if an external force, such as a gust of air, tends to incline the ship forward and accelerate it into a dive, the tip path plane of the rotor blades 56 tilts backward from the plane of rotation as the speed increases because of the action of the relative wind described above, and because the backward tilt introduces a rearward component of the thrust, which, acting above the center of gravity produces a moment restoring the aircraft to trimmed attitude. The backward tilt is also felt by the helicopter fuselage through the offset connections of the rotor blades 56 to the rotor head in a direction such as to bring the ship into a nose-up position and return it into the original flight path. Thus, as the blades flap backward with increased speed, there is a tendency for the aircraft to return to its original level flight speed, and conversely as the nose of the fuselage is tipped up by an external force, the blades will flap forward of the axis of rotation, and tend to bring the aircraft back into its original inclination. In such a manner this combination of elements produces a substantial measure of static stability for the helicopter.

It has been found advantageous in obtaining data on the flapping of rotor blades with respect to the fuselage to select an arbitrary axis in the body 30. A part of the discussion above and the charts of the action of the rotor blades in their path of revolution has been taken with reference to a line vertical with respect to the flight path. The tilting of the tip path plane with respect to such vertical reference is what causes translation of the craft through the supporting air. However, it is impractical, if not impossible, to obtain data of the action of the rotor blades with respect to a vertical line drawn to the flight path without the use of intricate and cumbersome gyroscopic mechanism for obtaining a vertical reference and linking the same with the blades of the rotor system to obtain such a relationship. For this reason, the charts of Figs. 24 and 25 have been shown wherein the flapping of the blades has been taken with relation to an arbitrary axis in the body of the helicopter.

If we include approximately a 30-degree shift of phase which may occur due to the dissymmetry of forward flight, inertia lags in flapping, and the vibration frequency of a blade; it has been found that at a given velocity the tip path of a rotor blade will follow a plane which will rise up from the plane normal to the axis of rotation over the front of the ship and will fall below the plane normal to the axis of rotation over the rear thereof. For a given velocity of 60 miles per hour this displacement of flapping is less than that for a velocity of 80 miles per hour, if no control is being applied in either case.

In the upper part of Fig. 25 these curves are represented in magnitude and displacement similar to the actual experimental data. The low point of the curve is the normal flapping position which occurs near the tail of the craft, while the maximum point of the curve will represent the highest flapping which occurs adjacent the front of the craft. It will be noted that for the same total pitch, the displacement of the 80 miles per hour curve is considerably greater than the 60 miles per hour curve. The plane of reference from which these displacements are measured both in theory and in practice, is the plane of the rotor hub 52 or the plane perpendicular to the rotor drive shaft axis. This axis is usually referred to as the real axis of the aircraft. The axis which is normal to the displaced tip path plane is usually referred to as the virtual axis.

In the lower portion of Fig. 25 the solid line A represents the flapping curve of the main rotor blades with no control applied at a forward velocity of 80 miles per hour which is identical to the $v=80$ full line curve in the upper portion of Fig. 25. This curve represents either the theoretical curve or the actual curve in the particular condition when sufficient tilt of the aircraft is obtained by a forwardly located center of gravity, and proper fuselage drag value, in order to maintain the given forward speed of 80 miles per hour without applying manual control. The curve B in the lower portion of Fig. 25 (which is shown in short dashes) represents a typical sinusoidal variation of blade incidence which might actually be imposed on the rotor to maintain the required forward tilt of the rotor drive shaft axis for a more rearwardly displaced center of gravity location and lower fuselage drag value. Displaced by 90 degrees from this curve and of similar magnitude is the theoretical flapping curve C which would be described by the tip of a blade in still air as this cyclic control was applied and represented by long dash lines. When this theoretical flapping curve C due to control is algebraically added to the flapping curve A of forward flight without control applied, the final resultant curve can be seen as represented by a line D composed of dots and dashes. This final curve is illustrative of an actual experimental curve of flapping displacement obtained from average operating conditions. It will be noted that the maximum upward flapping occurs at approximately the 210-degree position, adjacent the front of the helicopter; and the minimum flapping occurs adjacent the tail thereof.

In the rotation of a rotor blade 56 around its axis, the blades will flap up and down out of a plane normal to such axis. In so flapping angular accelerations and decelerations will appear, and will modify the action of a blade accordingly. Such accelerations may be superposed upon the sinusoidal curves (which have been used in explaining the practical operation of the device) to obtain true values corrected with different lags and leads caused by inertia of parts, by the aerodynamic damping of a blade in the air and the gyroscopic effects of the rotating system. For this reason, the curves represented in Figs. 23 through 25 will not be exact, but are to be considered only as approximates for the purpose of fully explaining the instant invention in a manner to enable others skilled in the art to build and operate the same. For example, the flapping due to manual control may be up at the rear of the ship for forward flight and down at the front of the ship. The acceleration due to this control

Certificate of Correction

Patent No. 2,517,509                                            August 1, 1950

IGOR I. SIKORSKY

It is hereby certified that error appears in the printed specification of the above numbered patent requiring correction as follows:

Column 13, line 1, beginning with the syllable "copter" strike out all to and including the syllable "down-" in column 14, line 75, and insert the same after "heli-" in column 10, line 75;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*

UNITED STATES PATENTS

| Number | Name | Date |
|---|---|---|
| 2,225,525 | Pitcairn | Dec. 17, 1940 |
| 2,256,635 | Young | Sept. 23, 1941 |
| 2,317,340 | Bennett | Apr. 27, 1943 |
| 2,318,259 | Sikorsky | May 4, 1943 |
| 2,318,260 | Sikorsky | May 4, 1943 |
| 2,325,632 | Pullin | Aug. 3, 1943 |
| 2,338,935 | Hafner | Jan. 11, 1944 |
| 2,352,342 | Pitcairn | June 27, 1944 |
| 2,380,582 | De La Cierva | July 31, 1945 |
| 2,383,038 | Boss | Aug. 21, 1945 |

FOREIGN PATENTS

| Number | Country | Date |
|---|---|---|
| 17,850 | Great Britain | of 1915 |

OTHER REFERENCES

Aero Digest, pp. 74, 75, 217, 219 and 221, Jan. 15, 1944.

Journal of the Aeronautical Sciences, June 1942, pp. 309, 310 and 311.

Certificate of Correction

Patent No. 2,517,509                                                              August 1, 1950

IGOR I. SIKORSKY

It is hereby certified that error appears in the printed specification of the above numbered patent requiring correction as follows:

Column 13, line 1, beginning with the syllable "copter" strike out all to and including the syllable "down-" in column 14, line 75, and insert the same after "heli-" in column 10, line 75;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*